April 17, 1945. W. H. SILVER 2,373,920
LISTER
Original Filed Jan. 29, 1940 3 Sheets-Sheet 1
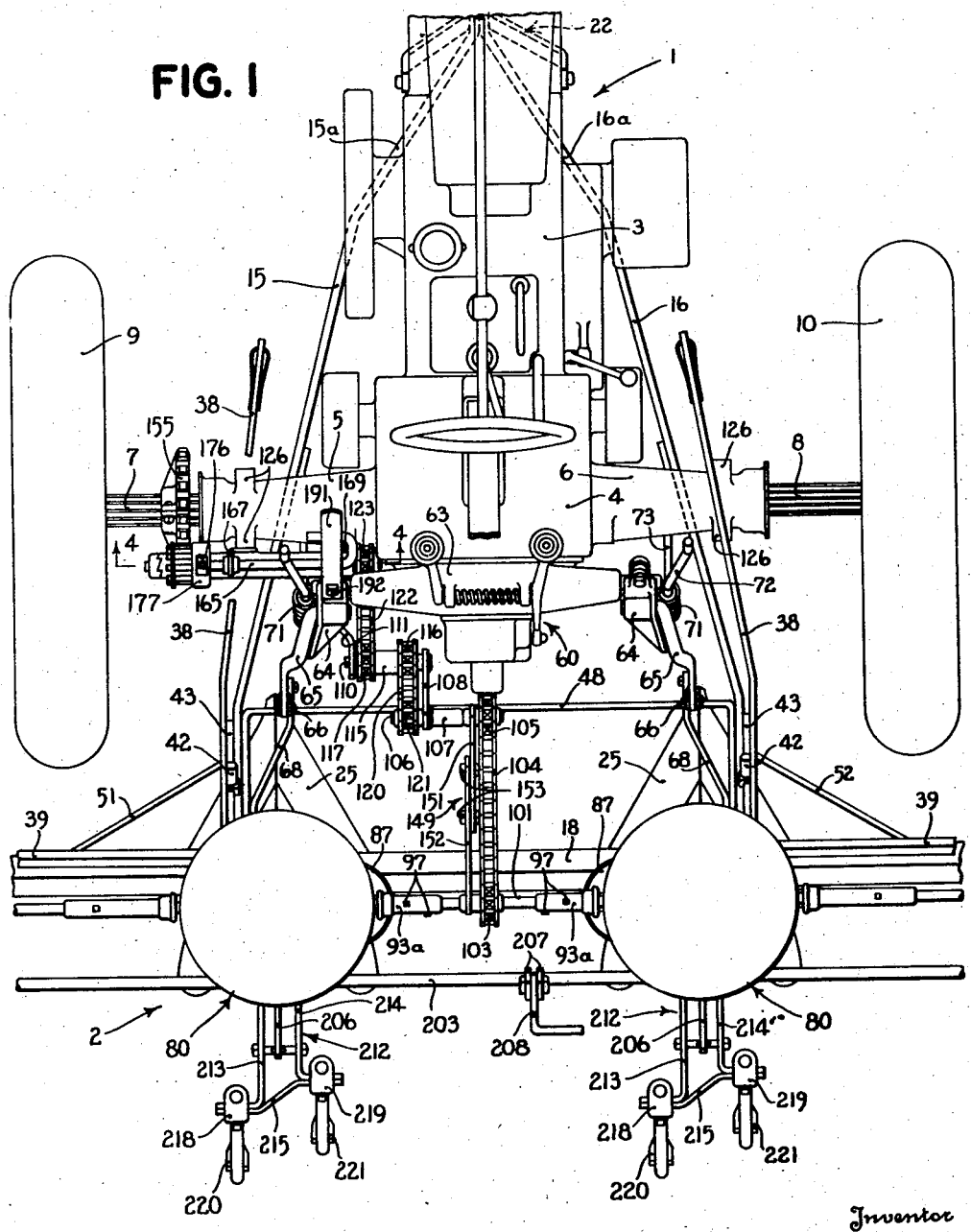
FIG. 1
Inventor
WALTER H. SILVER
Attorneys April 17, 1945. W. H. SILVER 2,373,920
LISTER
Original Filed Jan. 29, 1940 3 Sheets-Sheet 3

Inventor
WALTER H. SILVER

Patented Apr. 17, 1945

2,373,920

UNITED STATES PATENT OFFICE 2,373,920

LISTER

Walter H. Silver, Moline, Ill., assignor to Deere & Company, Moline, Ill., a corporation of Illinois Original application January 29, 1940, Serial No. 316,089. Divided and this application September 7, 1942, Serial No. 457,617

9 Claims. (Cl. 111—59)

This application is a division of my co-pending application, Serial No. 316,089, filed January 29, 1940, now Patent No. 2,323,278, issued June 29, 1943.

This invention relates generally to agricultural machines and is more particularly concerned with agricultural machines embodying a tractor and an implement operatively connected therewith.

The object and general nature of the present invention is the provision of an agricultural machine in which new and improved quick detachable driving connections are provided for operatively connecting a detachable operating unit or units with a driving part on the tractor. Another important feature of the present invention is the provision of a planting implement having covering shovels and means for raising the latter whenever necessary to clear the same of accumulated trash.

More specifically, it is a feature of the present invention to provide an agricultural machine in which the implement frame may be shifted relative to the supporting or propelling tractor and in which the driving connections by which the operating unit or units of the implement are driven from the tractor readily accommodate such relative movement. Particularly, it is a feature of the present invention to provide a sprocket and chain driving means from one of the rear axles of the tractor to the central portion of the implement. It is also a feature of this invention to provide a driving connection of the sprocket and chain type in which the aforesaid relative movement is accommodated by virtue of a swinging member carrying at least a part of the sprocket and chain driving means and operatively connected with either the tractor or the implement so as to be swung an amount necessary to accommodate the change in relative position of the implement with respect to the tractor so as to maintain the operating units of the tractor in driving relation with respect to the associated driving axle or other means on the tractor operating said units. An additional feature of the present invention resides in the provision of an agricultural machine of the bedder type, with readily detachable planting units and also readily detachable connections for driving the planting units from the tractor, and it is still further a feature of the invention to provide such driving connections with a disconnect clutch which, while being operatively associated with implement lifting means on the tractor, is automatically disconnected therefrom when the driving connections are detachable, which may be readily accomplished, as aforesaid.

Another feature of the present invention resides in the provision of an implement of the tractor-mounted type in which a readily detachable part serves to automatically establish a driving connection by the act of connecting said part to the tractor.

An additional feature of the present invention is the provision of manually controlled means for raising the covering shovels or other covering means of a planting implement, such as a lister. In some farming sections where stalks and the like are turned under in the fall and the planting of a new crop completed in the spring, the covering means of the planting machine sometimes tend to drag these stalks out of the ground and bring them to the surface, and sometimes the stalks and the like clog the shovels and prevent them from operating properly. It is a feature, therefore, of the present invention to provide means accessible to the operator and controlled by him for raising the shovels or other covering means whenever necessary to clear the same of accumulated stalks, trash and the like. Heretofore, so far as applicant is aware, it has been necessary for the operator under such conditions to dismount and clear out the accumulated trash by hand. The provision of means permitting the operator to readily raise the covering means is therefore an important feature of the present invention. Still further, in this connection it is a feature of the present invention to provide shovel raising means which is readily detachable from the implement, along with the planting units and the planter driving connections.

These and other objects and advantages of the present invention will be apparent to those skilled in the art after a consideration of the following detailed description of the preferred structural embodiment, taken in conjunction with the accompanying drawings illustrating the same.

In the drawings:

Figure 1 is a plan view of an agricultural machine constructed according to the principles of the present invention;

Figure 2:
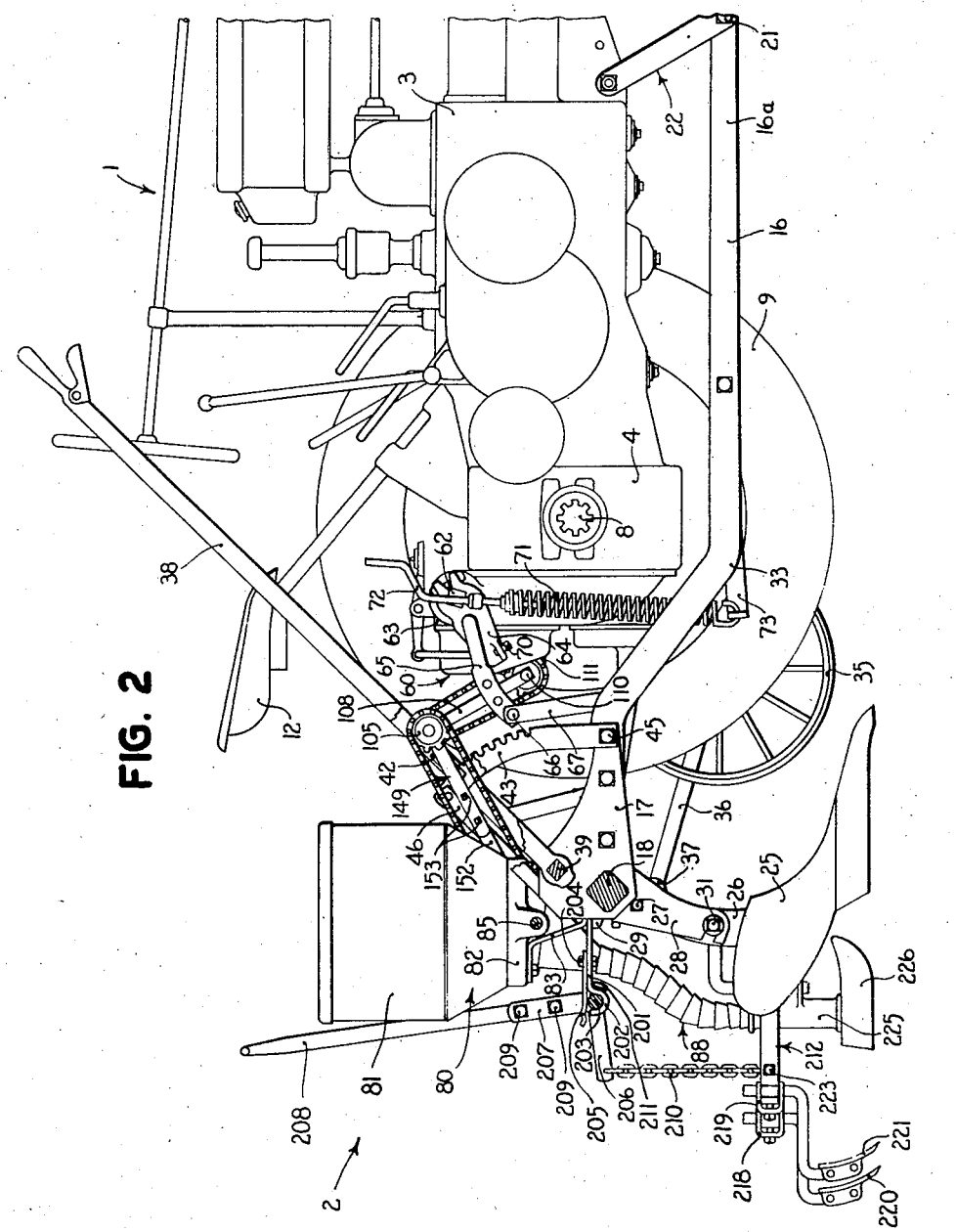
Figure 2 is a side view of the machine shown in Figure 1.
Figure 3:
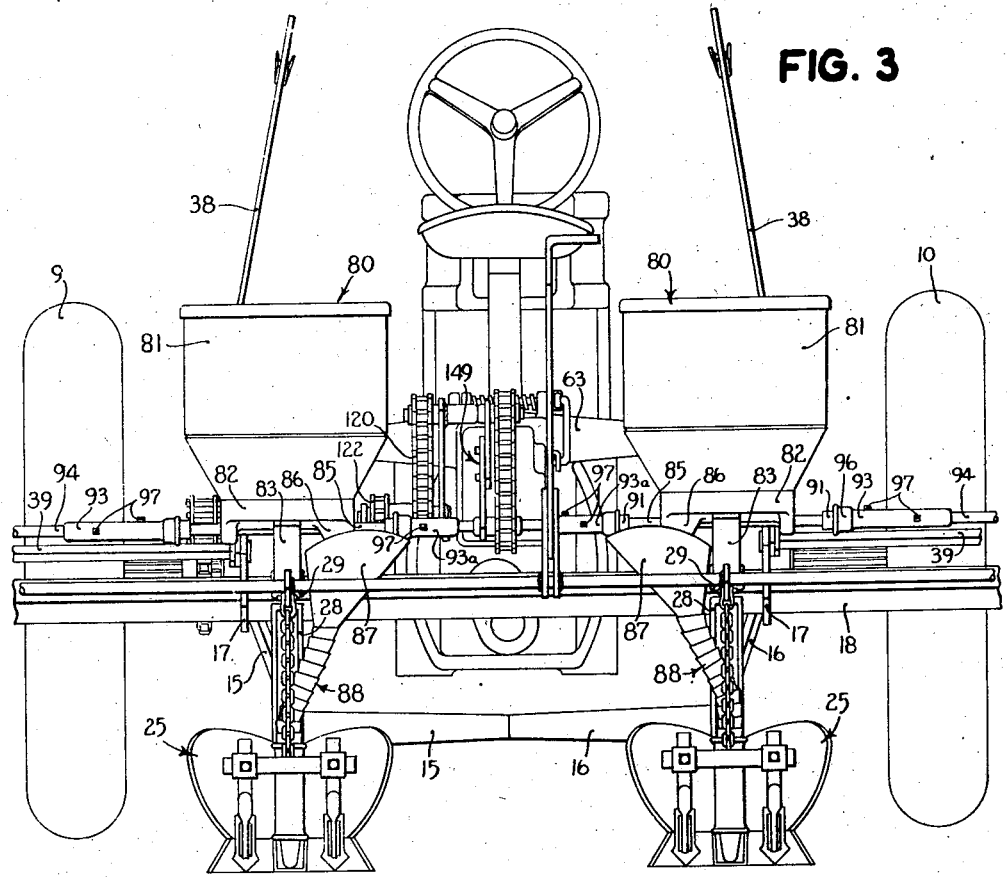
Figure 3 is a rear view of the machine shown in Figure 1.

Referring now to the drawings, more particularly to Figures 1 to 3, the agricultural machine in which the principles of the present invention have been incorporated comprises supporting means in the form of a tractor 1 and an implement of the integral type indicated generally at 2. The tractor 1 is of the usual construction, comprising frame means 3, a rear axle housing 4 having lateral extensions or quills 5 and 6 in which drive axles 7 and 8 are journaled for rotation. Rear drive wheels 9 and 10 are fixed to the axle shafts 7 and 8, respectively. In Figure 2, the near rear wheel has been removed in order to show the other parts of the machine more clearly. A seat 12 forms the operator's station on the tractor when operating the outfit.

The implement 2 as disclosed is a bedder or middlebreaker and includes a frame made up of two generally longitudinally extending bars 15 and 16 connected at their rear ends by plates 17 to a transverse frame bar 18 which extends laterally outwardly at each side of the tractor and rearwardly of the wheels 9 and 10, the frame bars 15 and 16 having the requisite length to accommodate this arrangement. The frame bars 15 and 16 are formed at their forward ends with convergent sections 15a and 16a which are connected at 21 to a hitch connection of any suitable construction, as indicated at 22. Preferably, however, the hitch connection 22 is of the type which accommodates some generally longitudinal shifting movement of the associated implement frame, which may be due to a yielding of the hitch under excessive draft loads or may be provided for adjustment purposes to dispose the tools or other operating means in different positions relative to the tractor. The implement 2 includes a plurality of tools or furrow openers in the form of lister bottoms 25. In the machine illustrated there are four bottoms fixed to the transverse implement frame bar 18, but only the two central bottoms have been shown in the drawings (Figures 1 and 3). The two outer tools are disposed outwardly beyond the rear tractor wheels 9 and 10 and are of substantially the same construction as the two tools shown. Each bottom 25 is fixed to a standard 26 which is pivoted at 27 to a bracket 28 that is fixedly clamped to the bar 18. To this end, each bracket 28 has a cap 29, and the two are bolted together so as to fixedly secure the associated bottom to the frame bar 18. Since the latter is of uniform cross section, the lateral spacing between the several tools 25 may be varied as desired to accommodate different row spacing. A friction clamp 31 (Figure 2) fixedly secured the standard 26 to the associated bracket, as will be readily understood. As shown in Figure 2, the beams 15 and 16 are formed with a section 33 which is bent so as to clear the tractor axle housing, and then the beams are extended upwardly and rearwardly to their points of connection with the transverse frame bar 18. The implement frame is thus capable of vertical floating movement relative to the tractor about its drive connection 21 therewith. At each laterally outer end, or adjacent thereto, of the transverse frame bar 18, there is connected a gauge wheel 35 which is mounted on the forward end of a crank axle 36 (Figure 2), the rear end of which is pivoted to a bracket 37 that is fixed to the frame bar 18 in any suitable manner. If desired, the gauge wheels 36 and associated parts may be connected to the frame bar 18 inside of the laterally outer bottoms (not shown) and outside the inner bottoms 25, shown in Figure 1, and the position of each gauge wheel is controlled by a lever 38 fixed at its lower end to a rockshaft 39 (Figure 2) which is mounted for rocking movement at its inner end in a bearing support or other means carried by the associated connecting plate 17. Each lever 38 is provided with suitable detent mechanism 42 cooperating with a sector 43 fixed to the associated plate 19 or the implement frame in any suitable manner, such as a bolt 45 (Figure 2) and an upper strap or bracket 46. The bolts 45 are also utilized to secure a cross brace 48 (Figure 1) to the longitudinal frame beams 15 and 16. If desired, the frame may also be reenforced by diagonal braces 51 and 52.

The outer end of each of the rockshafts 39 is operatively connected to swing the associated gauge wheel 35 and crank axle 36 for the purpose of determining the operating position of the tool means 25. The particular manner in swinging the crank axles 36 and associated gauge wheels 35 by the rockshafts 39 and hand levers 38 does not per se form a part of the present invention. It will therefore be sufficient to note that each hand lever 38 controls a gauge wheel and when locked to its associated sector each hand lever 38 fixes the associated gauge wheel against movement relative to the implement frame, whereby the operating position of the tool means is determined. Furthermore, the gauge wheels and associated parts may be lifted with the tools out of operating position and into a transport position whenever the implement frame is raised.

As best indicated in Figures 1 and 2, the implement frame 2 is raised and lowered under the control of power lift mechanism carried by the tractor and indicated in its entirety by the reference numeral 60. The power lift mechanism per se is of conventional construction, deriving power for its operation from the tractor motor and including a transversely disposed rockshaft 62 mounted for rocking movement in the upper portion of a power lift casing 63 and extending laterally outwardly therefrom at each end, an arm 64 being fixed to each end of the power lift shaft 62. A second arm 65 is pivoted to each arm 64 and at its outer end is pivoted, as at 66, to a generally vertically extending link 67 which at its lower end is pivoted to the associated beam, 15 or 16, by a bracket 68 (Figure 1). Each pair of the interconnected arms 64 and 65 are capable of relative movement one with respect to the other so as to permit the implement to have the vertical floating movement, as described above, when in operation. However, stop means 70 is carried by one of the arms so as to engage the other whereby when the power lift shaft 62 is rocked, both arms swing together as a single arm to raise the associated portion of the implement.

Normally, when the outfit is in operation, the two lifting arms 64 and 65 are capable of relative movement, as shown in Figure 2, whereby the implement is entirely independent of the tractor, so far as its position is concerned, the implement working at the depth determined by the setting of the two lever-controlled gauge wheels. Therefore, the implement may conform to all irregularities in the ground surface encountered during operation, yet uniformity of work is insured. When in operation, especially when four bottoms are utilized, together with planting units described below, auxiliary springs 71 are provided. Each spring 71 is adjustably connected at its upper end by a crank 72 to the associated power lift arm 64, and the lower end of each spring 71 is connected by a bracket 73 to the associated implement beam. These auxiliary springs tend to offset the weight of the equipment. The arrangement and connection of the auxiliary springs 71 are disclosed in detail and claimed in my prior patent, No. 2,196,037, dated April 2, 1940, to which reference may be had, if necessary.

The implement as so far described is generally termed an integral bedder and when equipped with lister or middlebreaker bottoms, as described, is used for bedding, blank listing, pointing out or plowing out stalk rows, cleaning middles, sweeping beds, and many other operations. Further, an implement of this kind is adapted to receive planting equipment for planting on the beds or in the trenches between the beds.

The planting equipment and the mechanism for driving the same and performing other operations in conjunction therewith will now be described.

A planting unit is preferably associated with each of the furrow openers 25, and each planting unit is indicated in its entirety by the reference numeral 80. It will be understood, also, that a planting unit is associated with each of the outer furrow openers (not shown). Each planting unit 80 consists of a seed can 81 supported upon a base or frame 82 which, in turn, is supported by means of a bracket 83 on the transverse frame bar 18, being preferably secured to the cap 29 at the upper end of the associated bracket 28. The base 82 includes conventional seed selecting mechanism which is driven by a transverse seeding shaft 85, which operates to select and deliver seed through a spout 86 into the funnel-shaped upper end 87 of a seed tube 88. As best shown in Figures 1 and 3, the delivery of the seed from each of the seed selecting mechanisms is performed within the convenient view of the operator. Each seed can and associated parts is readily detached from the supporting frame bar 18, or from the supporting brackets 83, either by disconnecting the brackets from the caps 29, or by disconnecting the seed cans from the brackets 83, whichever is the most convenient. The seed tubes 88 are detachable with the associated seeding units.

The seeding shaft 85 of each seeding unit 80 forms a more or less permanent part thereof and is disposed longitudinally of the transverse frame bar 18, as shown in Figures 1 and 3. The several seeding shafts 85 are adapted to be connected together by means especially adapted, first, to facilitate connecting the seeding shafts together, whether one, two, three, four or even more units are mounted on the same implement, and second, to facilitate the ready and convenient attachment and detachment of means for driving all of the seeding units from the tractor. To this end each seeding shaft carries at its ends thereof a connecting member 91, comprising a polygonal member, suitably secured to the ends of the shaft 85 by a set screw or other means. Between each end of each shaft 85 and the shaft 85 of the associated adjacent unit is a pair of telescopically associated members 93 and 94, the former being in the form of a sleeve having a socket end 96 which is adapted to non-rotatably receive the polygonal member 91. Each sleeve 93 carries one or more set screws 97 by which it is fastened in any one of various axial positions to the associated member 94. The laterally outer ends of the shaft members 94 may be connected directly to the corresponding member 91 of the outside unit associated therewith, or the member 94 may be connected thereto through another axially adjustable sleeve 93, if desired.

According to the principles of the present invention the means for driving the several seeding shafts 85 comprises detachable connections driven from one of the tractor wheels, or some other part of the tractor, and a centrally located shaft section 101 which at its laterally outer ends is connected to telescopic sleeves 93a of substantially the same construction as but somewhat shorter than the sleeves 93 described above. A sprocket 103 is fixed to the central portion of the shaft section 101 and receives a driving chain 104 which is trained around a sprocket 105 carried at one end of a short shaft 106 that is supported for rotation in a sleeve 107, one end of which is fixed to an arm 108. The end of the arm 108 opposite the shaft receiving sleeve 107 is fixed to a short shaft 110 which is mounted for rocking movement in a bracket 111 which is fixedly secured to the left-hand axle housing 5 by means which will be described below. Journaled for rotation on the shaft 110 is a sleeve 115 that carries two sprockets 116 and 117. The sprocket 116 receives a chain 120 which at its upper end is trained around a sprocket 121 that is fixed to the shaft 106 upon which the sprocket 105 is fixed. The sprocket 117 receives a chain 122 which at its inner or forward end is trained around a sprocket 123 that is fixed to the inner end of a shaft driven from a sprocket on the left-hand driving axle, as best shown in Figure 4, which also shows the bracket that detachably supports the shaft last mentioned and also the bracket 111 that carries the shaft 110.

Figure 4:
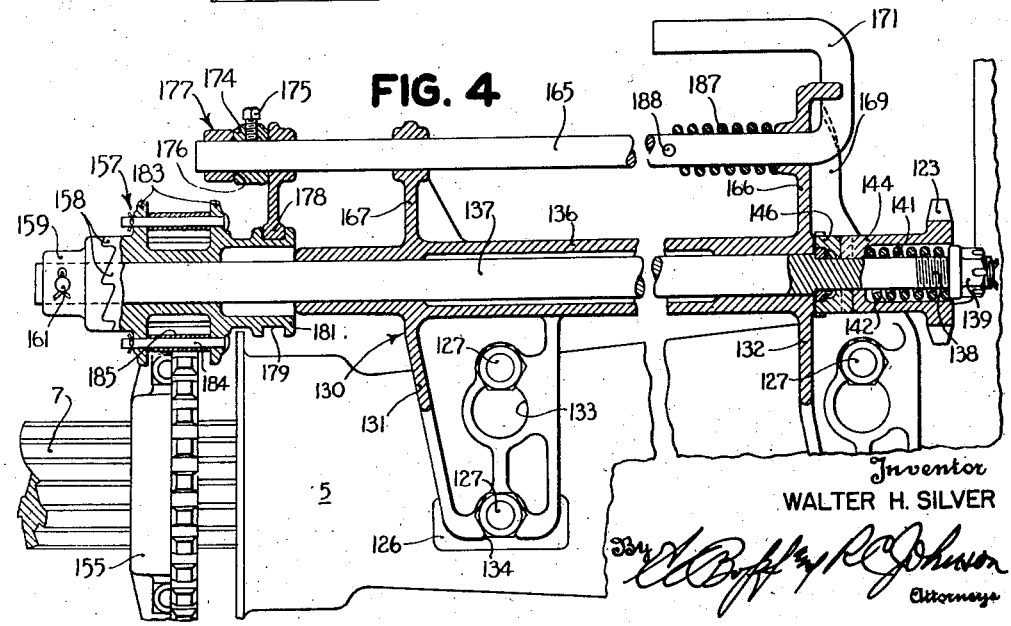
Figure 4 is an enlarged fragmentary section taken generally along the line 4—4 of Figure 1.

Referring now to Figure 4, the left-hand axle housing 5 is provided with lugs 126 which are apertured to receive attaching studs 127, being standard equipment for the tractor 1. A supporting bracket 130 is provided with extensions 131 and 132 each of which is provided with a keyhole slot 133 and an open slot 134 which engage the studs 127, whereby when the latter are tightened, the bracket 130 is firmly fixed to the tractor, but when the studs 127 are loosened, the bracket 130 may be readily detached from the tractor merely by disengaging the same from the loosened studs. The bracket 130 includes a sleeve section 136 in which a shaft 137 is journaled for rotation. The inner end of the shaft 137 is screw-threaded, as at 138, and receives a nut 139. This portion of the shaft 137 is reduced in diameter and receives a spring 141 which is seated in an axial recess 142 formed in the extended hub 144 of the sprocket member 123, which is rotatable on the inner reduced end of the shaft 137. The inner end of the hub 144 is serrated and cooperates with a similar member 146 which is fixed to the inner end of the shaft 137 in any suitable manner. The hub 144 and the member 146, together with the spring 141, constitutes a slip clutch, as will be readily understood. The sprocket 123 drives the chain 122, and the latter drives the chain 120 through the two sprockets 116 and 117 and the sleeve 115 to which they are fixed. The chain 120 drives the chain 104 through the sprockets 105 and 121, and the chain 104 drives the seeding shaft driving section 101. The arm 108, to which the sleeve 107 receiving the short shaft 106 is fixed, is mounted for rocking movement in a generally longitudinal direction by virtue of its pivotal support on the rear end of the bracket 111. The several chains and associated sprockets therefore form articulated means for driving the seeding units, which means accommodates the fore and aft movement of the implement relative to the tractor, which as described above, arises either by virtue of the yielding hitch or by virtue of longitudinal adjustment at the point of hitch. The arm 108, carrying the shaft 106 and the associated sprockets 105 and 121, is connected with the shaft section 101 by means of an adjustable link 149 which consists of two sections 151 and 152 adjustably secured together by bolts 153. The upper end of the upper link section 151 is pivoted for movement about the axis of the shaft 106, and the lower end of the lower link section 152 is connected for pivotal movement about the axis of the shaft section 101. The adjustment provided by the two link sections and the connecting bolts 153 therefore permit adjusting the chain 104 as may be required, yet the link 149 as a whole swings the arm 108 so that the two articulated driving chain sections 120 and 104 accommodate any longitudinal movement of the implement frame relative to the tractor. They also accommodate vertical movement of the frame relative to the tractor as well as any lateral tilting. In this respect, the connection of the chain 104 to the central portion of the implement means facilitates the driving connections accommodating relative tilting movement in a lateral direction between the implement and the tractor.

For driving the shaft 137 that is supported for rotation on the tractor by the bracket 130, the driving axle 7 at the left side of the tractor in the axle housing 5 is provided with a driving sprocket 155. This part is preferably made of two mating sections, whereby the sprocket may be mounted on the driving axle 7 without removing the rear wheel 9. The bracket 130 is arranged to support the shaft 137 with its outer end disposed adjacent to driving sprocket 155. A roller pinion 157 is mounted for rotation on the outer end of the shaft 137 and at its laterally outer face is provided with clutch teeth 158 that are adapted to mesh with similar clutch teeth formed on a clutch member 159 pinned, as at 161, to the outermost end of the shaft 137. Thus, when the roller pinion 157 is engaged with the clutch member 159, and when the bracket 130 is fixed to the axle housing so as to hold the shaft 137 with the roller pinion 157 in engagement with the driving sprocket gear 155, the drive is transmitted from the driving axle 7 through the roller pinion 157 and the shaft 137 to the pinion 123, and from there the drive is transmitted through the driving chains 122, 120, and 104 to the shaft section 101 that drives the various seeding units.

For moving the clutch means 158, 159 into and out of engagement, a rod member 165 is mounted for rocking and sliding movement in a pair of laterally spaced apart lugs 166 and 167, preferably formed integrally with the bracket 130. The lug 166 is provided with a cam flange 169 with which the bent end 171 of the rod member 165 cooperates. The outer end of the rod 165 receives a collar 174 which is fixed thereto by a set screw 175, and the collar 174 is disposed in a slot 176 formed in a clutch shifting member 177. The latter is provided with a depending fork 178 which is received in a groove 179 formed in a laterally inwardly extending flange section 181 formed on or carried by the roller pinion 157. The latter is formed with a pair of transversely spaced flanges 183 which are apertured to receive pins 184 upon which rollers 185 are mounted. The spacing between the flanges 183 is sufficient to permit the roller pinion 157 to shift axially relative to the sprocket gear member 155 that is fixed to the driving axle 7, and as best shown in Figure 4, the extended hub section 181 of the roller pinion 157 is formed to telescope with the laterally outer portion of the bracket 130 in which the shaft 137 is journaled for rotation. Thus, axial shifting movement of the rod 165 transversely of the tractor serves to move the roller pinion 157 into and out of engagement with the clutch member 159 that is fixed to the outer end of the shaft 137. The bent end 171 of the rod 165 is so arranged that when it lies in an upper and forward position, with respect to the axis of the rod 165, a spring 187 that surrounds the inner end of the rod 185 and bears at one end against the bracket 166 and at the other end against the pin 188 carried by the rod 165, causes the latter to shift the member 177 and the roller pinion 157 into a position in which the clutch teeth 158 engage the clutch member 159. Thereupon rotation of the driving axle 7 and the sprocket gear member 155 rotates the shaft 137 and the driving connections therefrom to the shaft section 101. When the end 171 of the rod member 175 is rocked downwardly and forwardly, the cam flange 169 acts against the end 171 to cause the rod member 165 to shift laterally inwardly. This movement acts through the fork 178 to move the roller pinion 157 out of engagement with the clutch member 159, thereby interrupting the drive from the driving axle 7 to the shaft 137, thereby discontinuing the operation of the seeding units. The spring 187 is arranged so that it automatically returns the rod 165 to the position shown in Figure 4. The member 165 is automatically operated to disengage the clutch 158, 159 when the implement is raised, by means of an arm 191 (Figure 1) fixed to the left-hand power lift arm 64 in a position to engage the end 171 of the rod 165 and force it down over the cam flange 169 when the power lift shaft 62 is operated to raise the implement into its transport position. When the implement is lowered, the spring 187 returns the rod 165 to the position shown in Figure 4, thereby reengaging the seeding drive. The arm 191 is fastened to the power lift arm 64 by a bolt 192 or other suitable means.

In certain farming sections it is the custom to go through the field with the bedder after the crop has been harvested and plow under the stalks and other growth, forming new beds. In the following spring the beds are planted. In the latter operation, it has been found that the usual covering shovels associated with the planter engage the stalks and other growth, which were turned under in the previous bedding operation, and drag them to the surface, which necessitated frequently stopping the outfit to clear out the stalks and other trash which tend to accumulate on the covering shovels, clog them and prevent their proper operation. Generally, the covering shovels or other covering means are fixed to the planting units, either rigidly or held in position by spring means, and to pull out the stalks, trash and the like required the operator to stop the outfit and go around and remove the accumulations on the shovels or other covering means.

According to the present invention, I have provided an arrangement wherein the covering shovels are mounted for pivotal movement and are adapted to be raised by means accessible to the operator on the tractor seat, so as to clear out accumulated stalks, trash and the like without requiring that the operator stop the outfit.

Referring now more particularly to Figures 1 and 2, it will be seen that the present invention contemplates a bracket 201 fixedly secured to each of the furrow opener standards in any suitable manner, preferably, by being bolted between the seed can bracket 83 and the cap 29, as shown in Figure 2. Each seeding unit includes a bracket 201, and each bracket is provided at its rear end with a rockshaft receiving section 202 in which a rockshaft 203 is mounted for rocking movement. The shaft receiving sections 202 are open at their upper side so that the rockshaft may be disconnected merely by lifting the same away from the brackets 201. To hold the rockshaft 203 in position, I provide clips 205 which are pivoted, as at 204, to the bracket 201 associated therewith. By turning the clips 205 laterally about the bolt 204, it may be swung over into a position holding the rockshaft in place or laterally to one side thereof to permit the removal of the shaft when desired. The rockshaft 203 extends the entire width of the implement and is provided with a plurality of arms 206, there being as many arms as there are planting units 80. Preferably, each arm is fixed to the shaft 203 so as to permit lateral adjustment along the shaft, whereby the arms may be spaced according to the number of planting units. The manner of connecting each arm 206 to the associated shaft 203 is not specifically illustrated, since any form of connecting means may be utilized as desired. Preferably, however, each arm 206 is fixed to a sleeve that receives the shaft 203, and each sleeve carries one or more set screws by which the arm may be fixed to the shaft 203 to rock therewith. A pair of arms 207 are fixed, as by welding, to the shaft 203, and a hand lever 208 is disposed between and fixedly secured to the arms 207, as by bolts 209. If desired, the shaft 203 may be formed in right and left hand sections, with the arms 207 welded, respectively, to the inner ends of the two shaft sections, in which case the bolts 209 securing the arms 207 to the hand lever 208 serve also as means connecting the two shaft sections together.

The outer or rear end of each of the arms 206 is connected by a chain or any other suitable means, as indicated at 210, with the associated covering means. Generally, the covering means usually employed consists of a coverer frame 212, comprising a pair of bars 213 and 214 pivotally connected at their forward ends through the plow bottom standard 26 associated therewith, and a cross bar 215. Clamps 218 and 219 serve to fix the covering shovels 220 and 221 to the coverer frame 212. A bolt 223 or other suitable means connects the lower end of the chain 210 to the associated coverer frame 212. As best shown in Figure 2, each coverer frame 212 is arranged to extend rearwardly of the associated seed boot 225 so that the covering shovels are disposed rearwardly of the planter runner 226 which is fixed to the lower end of the seed boot 225, the latter being, in turn, fixed to the standard 26 in any suitable manner. The lower end of the seed tube 88 delivers seed to the boot 225 which directs the seed into the furrow opened by the bottom 25 associated therewith.

From Figure 2 it will be clear that when the stalks and other trash that tends to be collected by the covering shovels 220 and 221 under certain operating conditions reach the point where the proper operation of the covering means is affected, all the operator has to do is to reach back and rock the hand lever 208 forwardly, thus acting through the several chains to raise all of the covering shovels out of engagement with the ground and releasing the accumulated stalks, trash and the like. When this is done the operator merely releases the hand lever and the weight of the several covering units cause them to return to their operating position. If desired, spring means may be provided for urging the covering means downwardly into operating position. Any suitable means, such as a small stop 211 mounted on each shaft 203 and engageable with a part of the frame, such as the associated bracket 201 (Figure 2) may be provided for limiting the rearward movement of the lever 208. It will be understood that the outer planting units (not shown) are also provided with covering units and connected to be raised and lowered by the rocking of the shaft 203, in substantially the same manner as described above in connection with the two inner planter units shown in Figure 1.

From the above description it will be apparent that the agricultural machine I have provided embodies features whereby it may be readily changed over into a planting outfit, or into a bedder without planting equipment, quite readily. For example, looking at Figure 1, all that it is necessary to do to disconnect the drive from the gear 155 to the planting units is to disconnect the bracket 130, loosen the set screws 97 connecting the sleeves 93a to the shaft section 101, slip the sleeves 93a laterally inwardly away from the associated seeding shafts 85, whereupon the entire driving mechanism from the gear 155 to the seeding units may be removed from the machine. Likewise, the shaft 203 may be removed readily, merely by loosening the bolts 206, turning the clips 205 sideways, and then lifting the shaft 203 out of the brackets 201. The coverer frames 212 may be removed, if desired, by detaching the pivotal connection at their forward ends, as in conventional practice.

It will also be noted that the drive I have provided, extending from the driving axle 7 at one side of the tractor over to the central portion of the implement operating units, readily accommodates any lateral tilting of the implement with respect to the tractor without causing excessive relative movement between the various parts of the drive itself. Furthermore, the driving connections are such that the implement frame may be shifted longitudinally relative to the tractor, either by virtue of a yielding cushion hitch or by virtue of some adjustment which it may be desired to make, without affecting the efficiency of the drive. It may also be mentioned that the use of a roller pinion and a particular type of connection between the power lift arm 191 and the clutch throw-out mechanism are features which are important in this type of implement, in that the mere removal of the bracket 130 and associated parts effects a disconnection of the drive and the automatic throw-out mechanism, without requiring that any parts save the bracket be unbolted. The articulated driving connection also accommodates the fact that the arm 108, supporting a portion of the drive, and the implement frame rock about different centers.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising the combination with a tractor of an implement frame including generally longitudinally extending frame beams and a transverse frame bar secured to the rear ends of said beams, means connecting the forward ends of said frame beams with the tractor forward of the rear wheels thereof, said beams extending rearwardly beyond said rear wheels, a pair of standards fixed in laterally spaced relation to said transverse frame bar, furrow openers fixed to the lower ends of said standards, seeding means carried by said implement frame and including a pair of seeding units, each having seed depositing means disposed behind the associated furrow opener, means driven by one of the rear wheels for driving said seeding units, and driving means for driving said seeding units from said wheel driven means, said driving means including a shaft detachable from the tractor and carrying driven mechanism detachably connected with said first mentioned drive means, detachment of said shaft and said second mentioned driving means facilitating detachment of the seeding units from the implement frame.

2. An agricultural implement comprising the combination with a tractor having rear wheels, of an implement frame connected with the tractor for both fore and aft movement relative thereton and also lateral tilting about a generally longitudinal axis, a pair of standards fixed to the rear end of said frame in laterally spaced relation, a furrow opener carried at the lower end of each standard, a planting unit supported on the upper end of each standard, each planting unit including a drive shaft therefor, the drive shaft of one unit extending toward the drive shaft of the other, a central drive shaft connected adjacent its outer ends with the inner ends of said first mentioned drive shafts, and means deriving power from the rear axle of said tractor for driving said central shaft, said driving means including articulated means accommodating said fore and aft movement and connected with said central drive shaft and accommodating movement about said longitudinal axis.

3. An agricultural implement comprising the combination with a tractor of an implement frame connected at its forward end with the tractor for generally fore and aft movement relative thereto, seeding means carried by said frame rearwardly of the tractor and including seeding mechanism adapted to be driven, and means for driving said seeding mechanism from one of said tractor wheels including an articulated sprocket and chain mechanism operatively connected at one end with said seeding mechanism and comprising angled sections arranged to be extended or retracted in a generally fore and aft direction so as to accommodate movement of said implement frame, means detachably supporting the other end of said articulated sprocket and chain mechanism on said tractor adjacent one of the driving wheels, and means for driving said mechanism from the axle shaft of said one wheel.

4. In an agricultural implement comprising the combination with a tractor of an implement frame connected with the tractor and capable of generally fore and aft movement relative thereto, an operating unit carried by the implement frame and means on the tractor for driving the same, a driving connection between said means on the tractor and said operating unit comprising a driving sprocket driven by said means, a driven sprocket associated with said operating unit for driving the latter, chain means operatively connecting said sprockets, a swinging member receiving at least a portion of said chain means and operative by its swinging movement to cause said chain means to accommodate variations in the distance between said sprockets, means pivotally connecting one end of said swinging member with the tractor, and means responsive to movement of the implement frame and operating unit relative to the tractor for causing a corresponding swinging movement of said swinging member, said last mentioned means comprising a link pivotally connected at one end with the implement frame and at its other end with the other end of said swinging member.

5. A driving connection as defined in claim 4, further characterized by a bracket adapted to be connected to the tractor and supporting said swinging member for swinging movement, and said chain means including a double sprocket carried on the swinging end of said swinging member, a chain connecting the double sprocket with said driven sprocket, and a separate chain connecting the double sprocket with said driving sprocket.

6. An agricultural machine comprising the combination with a tractor of an implement adapted to be connected therewith and including operating means, said tractor having laterally extending axle housings and drive axles journaled for rotation therein, and a driving connection between the tractor and said operating means, comprising a bracket detachably connected with one of said axle housings, power transmitting mechanism supported by said bracket and detachably connected with said operating means, and means serving as a pair of gears for driving said mechanism from the driving axle carried in said one axle housing, said driving means being arranged so that one of said gear means is on said axle and the other on said bracket whereby driving relations are established by attaching said bracket and are automatically interrupted when said bracket and the associated portion of said driving mechanism are detached from the tractor.

7. For use with a tractor having an axle housing, a drive axle journaled for rotation therein, a drive gear fixed to said drive axle and a rockable lift arm, a drive connection comprising a bracket adapted to be attached to said axle housing, a driving member journaled for rotation with respect to and carried by said bracket, said member being adapted to be meshed with said drive gear when said bracket is attached to said axle housing, a disconnect clutch carried by said bracket and operatively associated with said rotatable member, and rockable means carried by said bracket for controlling said clutch, said rockable means including a part disposed in the path of movement of said lift arm, whereby fixing said bracket in position on said axle housing automatically disposes said part in a position to be operated to control said clutch by said lift arm and also automatically establishes the drive from said drive gear on the tractor axle to the driving member on said bracket.

8. An agricultural implement comprising the combination with a tractor, of an implement frame connected with the tractor for both fore and aft movement relative thereto and also lateral tilting about a generally longitudinal axis, seeding means carried by said frame rearwardly of the tractor and including seeding mechanism adapted to be driven, and means for driving said seeding mechanism from the tractor including relatively movable parts extending rearwardly to accommodate said fore and aft movement of the implement frame and disposed generally centrally so as to accommodate said lateral tilting of the implement frame relative to the tractor about said generally longitudinal axis.

9. The invention set forth in claim 8, further characterized by said driving means also including a laterally extending section and means connecting it to be driven from one of the axle shafts of the tractor.

WALTER H. SILVER.